(12) United States Patent
Vanasco

(10) Patent No.: US 8,688,710 B2
(45) Date of Patent: Apr. 1, 2014

(54) CONTENT MANAGEMENT SYSTEM AND METHOD FOR MANAGING AND CLASSIFYING DATA ABOUT ENTITIES AND FOR PROVIDING CONTENT INCLUDING THE CLASSIFIED DATA

(76) Inventor: Jonathan Brian Vanasco, Brooklyn, NY (US)

( * ) Notice: Subject to any disclaimer, the term of this patent is extended or adjusted under 35 U.S.C. 154(b) by 466 days.

(21) Appl. No.: 11/670,414

(22) Filed: Feb. 1, 2007

(65) Prior Publication Data

US 2008/0189284 A1 Aug. 7, 2008

(51) Int. Cl.
G06F 17/30 (2006.01)
(52) U.S. Cl.
CPC ............ *G06F 17/30* (2013.01); *Y10S 707/944* (2013.01)
USPC ........... 707/748; 707/749; 707/751; 707/758; 707/944; 705/319; 705/320; 705/325
(58) Field of Classification Search
None
See application file for complete search history.

(56) References Cited

U.S. PATENT DOCUMENTS

| | | | |
|---|---|---|---|
| 5,903,878 A * | 5/1999 | Talati et al. | 705/26 |
| 6,714,944 B1 * | 3/2004 | Shapiro et al. | 1/1 |
| 2004/0261025 A1 * | 12/2004 | Rizk et al. | 715/530 |
| 2005/0027672 A1 * | 2/2005 | Arndt et al. | 707/1 |
| 2007/0150315 A1 * | 6/2007 | Bennett et al. | 705/3 |
| 2007/0266003 A1 * | 11/2007 | Wong et al. | 707/3 |

* cited by examiner

*Primary Examiner* — Anh Tai Tran

(57) ABSTRACT

A content management system manages data about entities and provides content including data about the entities. The content management system receives data about entities from originators associated with the entities. The content management system classifies the data and stores the classified data. The content management system may authenticate the data by determining an authenticator of the classified data. The authenticator may be the most appropriate person to authenticate the data. The content management system may determine an authenticator by determining the entity most related to the classified data and determining an originator representing or designated to authenticate the information. As such, the content management system may determine the originator in the best position to authenticate the data. The content management system may also receive a request from subscribers for content and create the content in response to the request. The data included in the content may be based on one of: the request from the at least one subscriber, a preference of the at least one subscriber, the at least one subscribers' relationship with the classified data, and authentication of the classified data.

39 Claims, 24 Drawing Sheets

Artist Management

With artist

[ mylo ▼ ]

Public Profile Operations

- ○ Edit Main Profile
- ● Add/Edit News
- ○ Add/Edit FindMeOn list
- ○ Add/Edit PR Links
- ○ Add/Edit Fansites
- ○ Add/Edit Photos

Syndication

- ○ View Basic Feeds
- ○ Create Custom Feed

Show Operations

- ○ View/Edit Shows (use this to edit an existing show you are associated with)
- ○ Generate a CSV document of verified shows (cand be read in excel, etc)
- ○ Add New Shows

Recordings Operations

- ○ View/Edit Recordings (use this to edit an existing recording you are associated with)
- ○ Add New Recordings

Access Operations

- ○ View Permitted Users and Grant Privileges to New User For this record ( Submit )

FIG. 10

Associate - Artist Operations name
Mylo

Verified Shows

| date | title | extended info & edit |
|---|---|---|
| 2006-05-10 | Mylo @ Hiro Ballroom ( New York ) | [Transaction History] |
| 2006-05-06 | Mylo @ District, The ( Miami ) | [Transaction History] |
| 2006-05-05 | Mylo @ Smart Bar The ( Chicago ) | [Transaction History] |
| 2006-05-03 | Mylo @ Boca ( San Francisco ) | [Transaction History] |
| 2006-05-02 | Mylo @ Plaza ( Vancouver ) | [Transaction History] |

Alleged Shows

| date | title | extended info & edit |
|---|---|---|

Refuted Shows

| date | title | extended info & edit |
|---|---|---|

FIG. 11

Associate - Artist Operations name
Against Me!

Detailed Information creation
This show was created by _____, acting as a artist-prfirm. The owner of this show is: Alkaline Trio

IMPORTANT

This is not a verified show. It DOES NOT appear on your syndicated listings.

You may do one of the following:

- ○ Confirm this listing as a version of this existing show in your verified scheduled:

[Select A Show ▲▼]

Selecting this option will approve this show as it appears on the original schedule for Alkaline Trio, and create a link between this show and the one you select from your own schedule. This WILL NOT import verifications from the other schedule.

- ○ Confirm this listing as a new show.

Selecting this option will copy the show as-is to your own schedule and import the current links and verifications to artists venues and promoters.

- ○ Refute this listing ( Submit )

FIG. 12A

Associate - Artist Operations

Default Feed - Mates Of State - shows-validated

About This Feed

The Validated Tour Dates feed is a listing of shows that people in your asset management pool have marked as validated.
Syndicated tour dates are only those dates that have been confirmed or entered by relevant parties within your asset collaboration group - they do not include tour dates that other artists/venues/promoters have simply alleged.

Feed Status

This feed is off. Feeds can be ON or OFF. By default, feeds are off.

To turn this feed on click here

Feed Access

Supported Formats

Currently there are 4 Syndication Options for Tour Dates

- Local Cache - a php page that sits on your server, every 4 hours it refreshes content from roadsound.
- iFrame - embed onto web pages with a line of javascript
- XML feed - xml that can be manipulated by your webserver, newsreader, or flash movies
- FlashVariables - a querystring argument that flash can parse ( it would be better to use xml, but you shouldn't even be putting tour dates in a flash move anyways )

Local Cache

To embed your feed on a webpage ( blog, social networking site, etc ), you can copy/paste the information into a php file. You must have php enabled on the server, with the ability to fopen foreign urls. Additionally, the user the script runs as must have write access for a file to save the cache dates to ( by default it is_validated_dates.html)

```
<?php
// validated-dates.php
// compatible with v1 shows-validated urls

// configure options
$feed_id = '8cf17ad40442';
$cache_file_name = '_validated-dates.html';
```

FIG. 13A iFrame Embed

To embed your feed on a web page ( blog, social networking site, etc ) , you can copy/paste the information below. It is a single line copy-paste.

```
<!-- start roadsound embed -->
<div id="roadsound_embed"
class="roadsound_embed"><script type="text/
javascript">var rs_embed_url= "http://
syn.roadsound.com    /artist/v1/8cf17ad40442/
```

The IFrame should work on all blogs, but not all SocialNetworking sites. We're working on ways to make them more embeddable. they are hCal microformat compatible.

Please note that the iFrame uses css markup which you can/should define in your website's css for seamless integration.

- rsFrame - div that contains all content
- entityShowsTable - div that contains the show info
- entityShowsOdd / entityShowsEven - alternating rows with data
- col0dd / colEven - alternating column headers

XML Syndication

```
http://syn.roadsound.com    /artist/
v1/8cf17ad40442/shows-validated/?
format=xml&v=1
```

This creates a simple xml document with the following components:

- showlisting - top level xml node
- showlisting | show - repeated node
- | show | id - roadsound show id - you can link back to roadsound using this template url for additional info: http://roadsound.com/shows/%s/
- | show | date - date
- | show | venuename - venue name

Flash Syndication

```
http://sn.roadsound.com    /artist/
v1/8cf17ad40442/shows-validated/?
format=flash&v=1
```

FIG. 13B

View Artist - Main Details main shows  Recordings  PR Links  Features  Photos  Fansites  Downloads
comments fans tags bloggings name
Mates Of State Viewing Current 2006 2004

| date | location | venue | time | extended info | verified? |
|---|---|---|---|---|---|
| 2006-04-30 | Indio | Coachella | | [Detailed Information] | (A) |
| 2006-04-28 | San Francisco | Great American Music Hall | | [Detailed Information] | |
| 2006-04-09 | Cleveland | Beachland Ballroom | | [Detailed Information] | |
| 2006-04-08 | Notre Dame | Legends Of Notre Dame | | [Detailed Information] | (A) |
| 2006-04-07 | Detroit | Magic Stick Maria Taylor | | [Detailed Information] | |
| 2006-04-06 | Chicago | Metro | | [Detailed Information] | |
| 2006-04-05 | Minneapolis | Varsity Theater | | [Detailed Information] | (A) |
| 2006-04-04 | Des Moines | Vaudeville Views | | [Detailed Information] | (A) |
| 2006-04-03 | Urbana | Canopy Club | | [Detailed Information] | |
| 2006-04-02 | Nashville | End, The | | [Detailed Information] | |
| 2006-04-01 | Asheville | Grey Eagle Music Hall | | [Detailed Information] | |

FIG. 14

Show - Main Details main   shows   Recordings   PR Links   Features   Photos   Fansites   Downloads

Who Is Going   Find / Trade Tickets   Tickets for Sale   comments   fans   tags   bloggings download ⬇ iCalendar .ics or .vcs date
206-03-19 admission type
unknown tickets
unknown metro
Austin venue
Blender Bar artists

Timonium

Stars

American Analog Set

Winter Pageant

I Love You But I've...

Plus Minus ⓐ

The lettered icons next to an artist name represent who has confirmed this data For an explanation, please click here

Users Who Are Looking For Tickets
No Friends need tickets.
No General Users Need tickets.

Users With Extra Tickets
No Friends have extra tickets.
No General Users have extra tickets.

Tickets for Sale
Want to list a ticket(s) for sale? Or looking for someone who is selling an extra? Do it here!

what does this mean?

FIG. 17

CONTENT MANAGEMENT SYSTEM AND METHOD FOR MANAGING AND CLASSIFYING DATA ABOUT ENTITIES AND FOR PROVIDING CONTENT INCLUDING THE CLASSIFIED DATA

FIELD

This invention relates generally to content management systems.

BACKGROUND

In the information-based society of today, the Internet enables users to access an abundance of information from around the world. Users easily can find useful information pertinent to their needs; however, users are not always certain whether the information found on the Internet is accurate, or even complete. This problem is particularly problematic in the music industry which, in recent years, has begun to increasingly utilize the Internet as a means to gain greater consumer exposure.

A common problem among artists, consumers, record labels, and other entities associated with the music industry, is lack of clear and efficient communication. With the advent of online music sites and social networking sites, information that is exchanged between artists and consumers has dramatically increased. Yet the surge of communication facilitated by these sites has exacerbated the problems caused by lack of communication. Misinformation or incomplete information rampantly pervades the Internet. Consumers cannot be certain that the information they look up on the Internet is accurate or complete, and artists cannot be certain that the information they release is being accurately and completely accessed by the public.

Moreover, artists, labels, and venues are often being promoted on multiple sites. Coordinating information among these entities often involves endless emailing and faxing of information back and forth, and then manually updating each independent site. Information can get misinterpreted or overlooked in this flurried exchange. While this problem is particularly troublesome in the music industry, it illustrates a greater problem typical to any scenario where information about entities is exchanged or promoted. Thus, there is a need for a system which provides industry entities a better way to manage information in a centralized and collaborative manner to ensure that information can be easily exchanged and accessed, and that information is accurately and completely represented to the public.

SUMMARY

An embodiment of the present disclosure is directed to a method for managing entity related data in a content management system. The method comprises allowing access to the content management system to a plurality of originators; receiving data about at least one entity from at least one originator; classifying the received data based on the relationship of the at least one originator to the at least one entity; and storing the classified data in the content management system.

Another embodiment of the present disclosure is directed to a method for providing content regarding an entity in a content management system. The method comprises receiving a request for content from at least one subscriber and creating content comprising data classified based on relationships of originators of the data to entities related to the data. The content is determined based on at least one of: the request from the at least one subscriber, a preference of the at least one subscriber, the at least one subscribers' relationship with the classified data, and authentication of the classified data. The method also comprises providing the content to the subscriber.

Another embodiment of the present disclosure is directed to a computer program product encoded with program code for supporting a content management system. The product comprises program code for allowing access to the content management system to a plurality of originators; program code for receiving data about at least one entity from at least one originator; program code for classifying the received data based on the relationship of the at least one originator to the at least one entity; and program code for storing the classified data in the content management system.

Another embodiment of the present disclosure is directed to a computer program product for providing content regarding an entity in a content management system. The computer program product comprises program code for receiving a request for content from at least one subscriber and program code for creating content comprising data classified based on relationships of originators of the data to entities related to the data. The content is determined based on at least one of: the request from the at least one subscriber, a preference of the at least one subscriber, the at least one subscribers' relationship with the classified data, and authentication of the classified data. The computer program product also comprises program code for providing the content to the subscriber.

Another embodiment of the present disclosure is directed to a computer capable of supporting a content management system. The computer comprises a processor configured to execute a content management application to allow access to the content management system to a plurality of originators, receive data about at least one entity from at least one originator, classify the received data based on the relationship of the at least one originator to the at least one entity, and store the classified data in the content management system. The computer also comprises a memory coupled to the processor for storing the content management application and the classified data.

Another embodiment of the present disclosure is directed to a computer capable of supporting a content management system. The computer comprises a processor configured to execute a content management application to receive a request for content from at least one subscriber, create content comprising data classified based on relationships of originators of the data to entities related to the data, wherein the content is determined based on at least one of: the request from the at least one subscriber, a preference of the at least one subscriber, the at least one subscribers' relationship with the classified data, and authentication of the classified data, and provide the content to the subscriber. The computer also comprises a memory coupled to the processor for storing the content management application and the classified data.

Additional embodiments of the present disclosure will be set forth in part in the description which follows, and in part will be obvious from the description, or may be learned by practice of the embodiments. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate examples of embodiments of the present disclosure and together with the description, serve to explain embodiments of the present disclosure.

FIG. 6-18 are diagrams illustrating a content management system for managing data in a music entertainment setting.

DETAILED DESCRIPTION

According to embodiments of the present disclosure, a content management system manages data about entities and provides content including data about the entities. The content management system receives data about entities from originators associated with the entities. The content management system classifies the data and stores the classified data.

The content management system may authenticate the data by determining an authenticator of the classified data. The authenticator may be the most appropriate person to authenticate the data. The content management system may determine an authenticator by determining the entity most related to the classified data and determining an originator representing or designated to authenticate the information. As such, the content management system may determine the originator in the best position to authenticate the data.

The content management system may also receive a request from subscribers for content and create the content in response to the request. The data included in the content may be based on one of: the request from the at least one subscriber, a preference of the at least one subscriber, the at least one subscribers' relationship with the classified data, and authentication of the classified data.

Reference will now be made in detail to the exemplary embodiments of the present disclosure, an example of which is illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments. These embodiments are described in sufficient detail to enable those skilled in the art to practice the invention and it is to be understood that other embodiments may be utilized and that changes may be made without departing from the scope of the invention. The following description is, therefore, merely exemplary.

Figure 1:
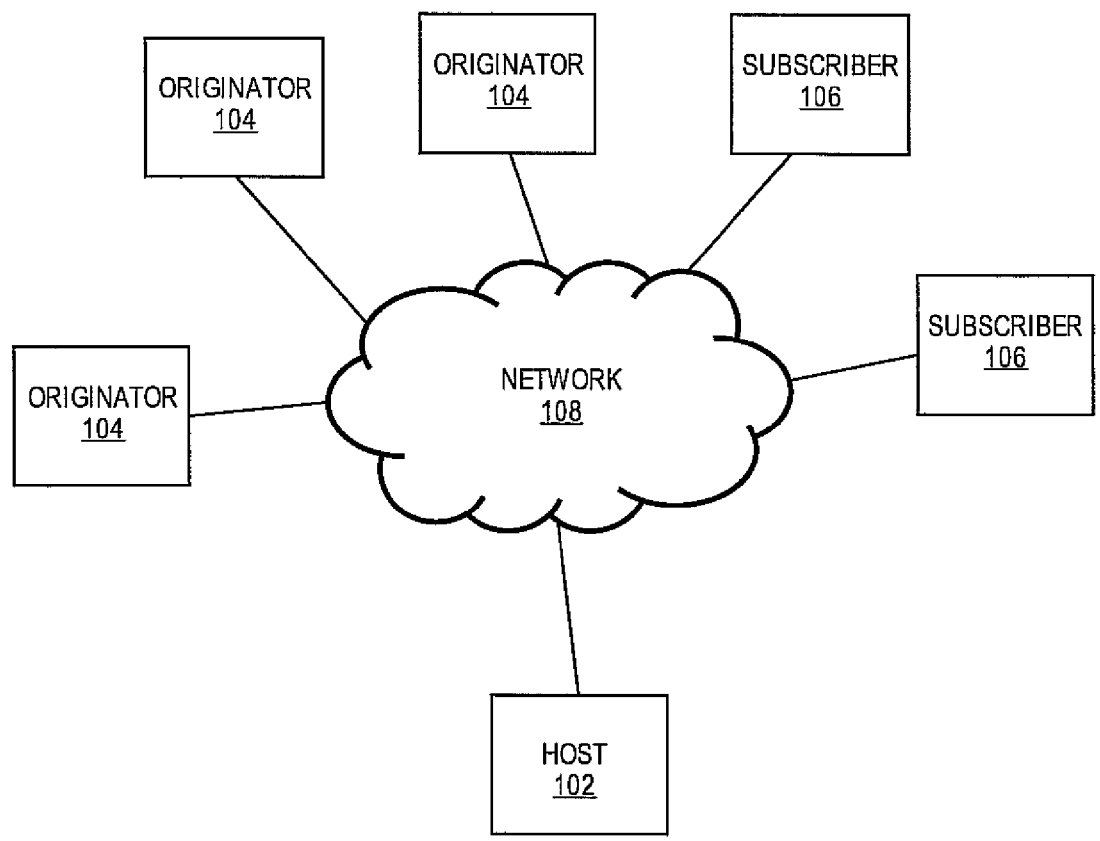
FIG. 1 is a diagram illustrating a system 100 incorporating a content management system consistent with embodiments of the present disclosure.

FIG. 1 is a block diagram illustrating a system 100 that is consistent with the embodiments of the present disclosure. As shown, system 100 may comprise one or more of a host 102, originators 104, subscribers 1061 and network 108. In general, system 100 may be implemented on a widely available data network, such as the Internet. For example, system 100 may be implemented as a combination website and applications that enables originators 104 to supply and subscribers 106 to view data in a content management system maintained by host 102. These components will now be generally described.

Host 102 serves as a platform for the content management system. Host 102 stores, manages, and provides access to the content management system. In general, host 102 is essentially a website host and content management application that stores, manages, authenticates, and publishes information shared by originators 104 and subscribers 106. Host 102 may be configured to host a content management system similar in fashion to other known content management systems coupled to a website host and database. In addition, host 102 may provide various application programming interfaces. Further, host 102 may create and provide content including data in the content management system to subscribers 106.

Host 102 may be implemented using a variety of devices and software. For example, host 102 may be implemented as a website running on one or more servers that support various application programs and stored procedures.

Originators 104 provide an interface for accessing the content management system maintained by host 102. Originators 104 may provide data about entities and authenticate entity data in the content management system hosted by host 102. Originators 104 may be any type of person or thing capable of interacting with the content management system hosted by host 102 or a person or thing that the content management system hosted by host 102 may simply access or receive information from. For example, originators 104 may be a person, company, corporation, government, data feed, website and the like.

Subscribers 106 provide an interface for accessing data in the content management system hosted by host 102. Subscribers 106 may request the content management system to create and provide custom content. Subscriber 106 may be any type of person or thing capable of interacting with or otherwise accessing the content management system hosted by host 102. For example, subscribers 106 may be a person, company, corporation, government, data feed, website, and the like.

Originators 104 and subscriber 106 may be implemented using a variety of devices and software. For example, originators 104 and subscriber 106 may be implemented on a personal computer, workstation, or terminal. In addition, originators 104 and subscriber 106 may run under an operating system, such as the LINUX operating system, the MICROSOFT WINDOWS operating system, and the like. Originators 104 and subscriber 106 may also operate through an Internet browser application, such as FIREFOX by Mozilla, INTERNET EXPLORER by Microsoft Corporation, or NETSCAPE NAVIGATOR by Netscape Communications Corporation.

One skilled in the art will also recognize that originators 104 and subscriber 106 may be implemented with various peripheral devices, such as a display, one or more speakers, and other suitable devices. Originators 104 and subscriber 106 may also be implemented with various peripherals for accepting input, such as a keyboard, a mouse, and the like.

Although FIG. 1 shows several originators 104 and subscribers 1061 system 100 may include any number of originators 104 and subscribers 106. Further, one skilled in the art will realize that originator 104 may also be a subscriber 106 and vice versa.

The components of system 100 may be coupled together via network 108. Network 108 may comprise one or more networks, such as a local area network, the Internet, or other type of wide area network. In addition, network 108 may support a wide variety of known protocols, such as the transport control protocol and Internet protocol ("TCP/IP") and hypertext transport protocol ("HTTP").

Figure 2:
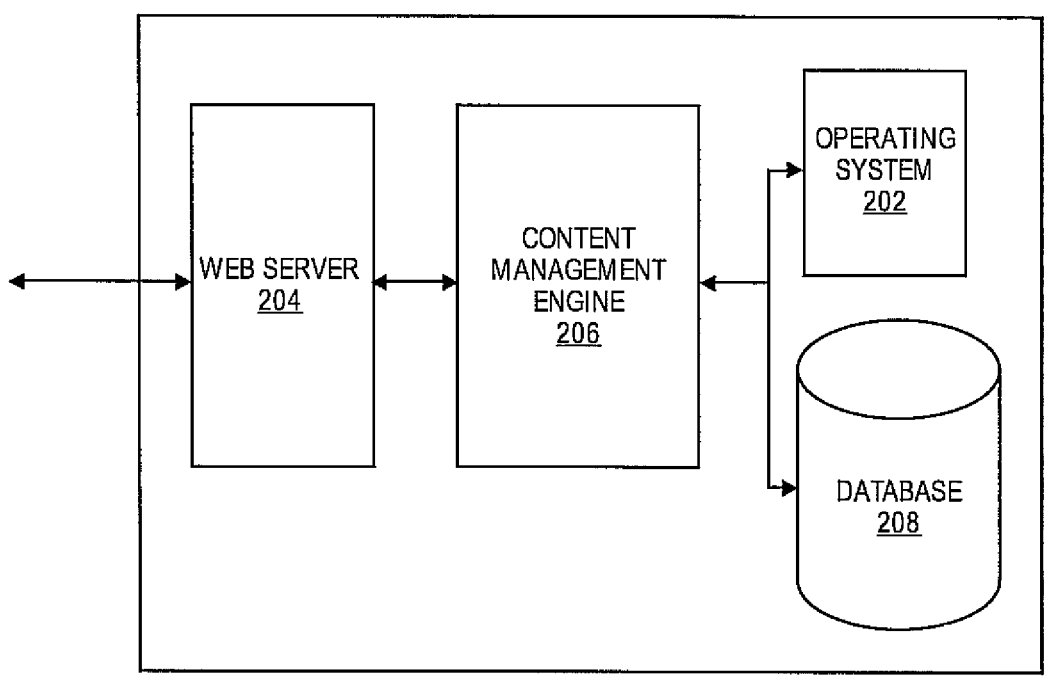
FIG. 2 is a diagram illustrating an exemplary architecture 200 consistent with embodiments of the present disclosure.

FIG. 2 is a diagram illustrating an exemplary architecture 200 for host 102 that is consistent with embodiments of the present disclosure. As illustrated, host 102 may comprise an operating system 202, a web server 204, a content management engine 206, and a database 208. These components may be implemented as software, firmware, or some combination of both, which may be loaded into memory of the machine embodying host 102. The software components may be written in a variety of programming languages, such as C, C++, Java, etc. These components will now be generally described.

Operating system ("OS") 202 is an integrated collection of routines that service the sequencing and processing of programs and applications running in host 102. OS 202 may provide many services, such as resource allocation, scheduling, input/output control, and data management. OS 202 may be predominantly software, but may also comprise partial or complete hardware implementations and firmware. Well-known examples of operating systems that are consistent with the principles of the present invention include the Linux operating system, the UNIX operating system, operating systems by MICROSOFT, and any type of open source operating system. For example, OS 202 may be a variant of BSD. In addition, OS 200 may operate in conjunction with other software, such as an application server, to implement various features of host 102.

Web server 204 provides interface, access, and communication to the content management system. Web server 204 may be implemented using any well-known technologies. For example, web-server 204 may be implemented using Apache/mod_perl server architecture. Communications may be based on well-known protocols and programming languages, such as HTTP, TCP/IP and Java. Interfaces provided by web server 204 may be implemented using well known Internet technologies, such as web pages, which are well known to those skilled in the art. Web server 204 may also provide secure communications with the content management system using well-known cryptographic techniques.

Content management engine 206 provides the logic for analyzing and managing the operations of host 102. As previously noted, content management engine 206 may be written in a variety of programming languages, such as C, C++, Java, etc.

For example, one responsibility of content management engine 206 may be managing data received from originators 104. Content management engine 206 may receive data from originators 104, classify the data, and store the classified data in database 208. Additionally, content management engine 206 may authenticate the data received from originators 104. Content management engine 206 may also create content and provide the content to subscribers 106.

Database 208 maintains data within the content management system. Database 208 may be implemented using well known database technology, such as relational databases, or object oriented databases. For example, database 208 may be implemented in PostgreSQL.

For example, database 208 may include information indicating one or more operating systems and applications installed on originators 104 and subscribers 106 as well as access account information for originators 104 and subscribers 106. Database 208 may also comprise information related to authenticating an originators 104 and subscribers 106 and determining the respective rights relative to one another. Other information that may be included in database 208 may comprise information, such as system and individual permissions of originators 104.

Database 208 may include data structures for storing data received from originators 104. Database 208 may also include data structures to cross-reference related data received from originators 104. Database 208 may further include information that indicates the permissions and delivery of the content to subscribers 106. Other information that may be included in database 208 may comprise information, such as system and individual permissions of originators 104.

Furthermore, database 208 may include other information related to the manner in which host 102 communicates with originators 104 and subscribers 106. For example, this information may relate to periodicity of notifications, email addresses, format of the information, and the like. Database 208 may include data structures to log the activities and transactions of its users. Activities, such as recent links, history of operations, etc., that may be logged in database 208 are well known to those skilled in the art.

Figure 3:
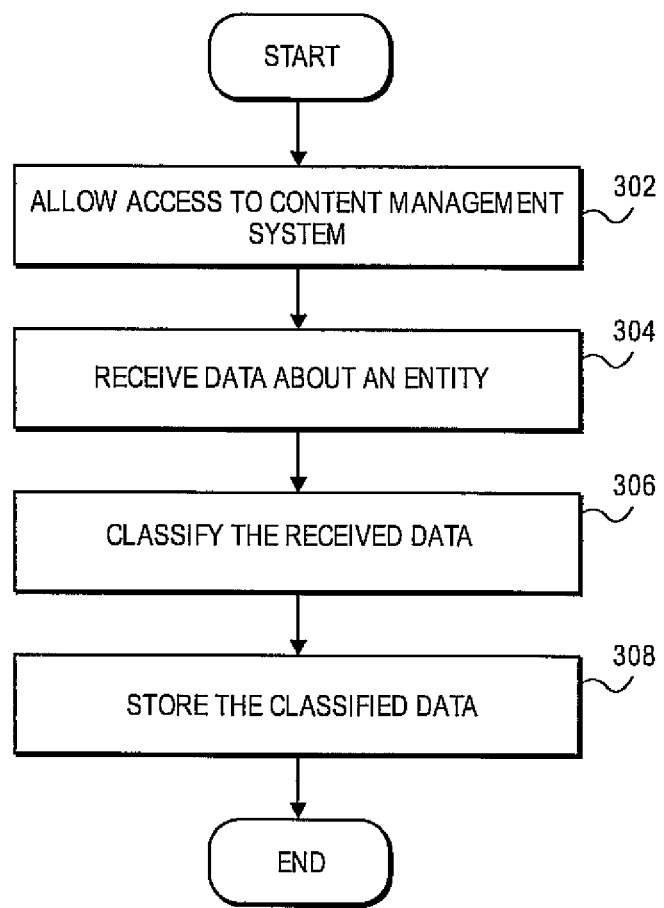
FIG. 3 is a flow chart illustrating a method 300 for managing a content management system consistent with embodiments of the present disclosure.

As mentioned above, a content management system hosted by host receives, classifies, manages, stores, and authenticates data from multiple originators about multiple entities. FIG. 3 is a flow-diagram illustrating a method 300 in which the content management system hosted by host 102 manages data from originators 104.

Method 300 begins with host 102 allowing access to the content management system to originators 104 (stage 302). Host 102 may allow access to the content management system by establishing access accounts for originators 104. The access accounts may include a login name and password. Host 102 may protect the access account using well-known cryptographic methods.

Host 102 may also associate an originators 104 access based on that particular originator 104 relationship with one or more entities. Entities are abstract constructs in the content management system to define the subject matter of data in the content management system.

For example, if host 102 hosted a content management system for television entertainment industry, exemplary entities may be television networks, television shows, production companies, directors, actors, and the like. Originators 104 related to the different entities would be persons or bodies designated by the entities or content management system to enter data about he entities. For example, a web site manager may be designated by a television network to enter data about the television network.

Next, host 102 receives data about an entity from an originator 104 (stage 304). Host 102 may receive data from an originator 104 through a website hosted by host 102. For example, originator 104 may send the data to host 102 by logging on to the content management system through a website using its access account. In order to protect the integrity of the data, host 102 may receive the data through a secure connection such as secure socket layer ("SSL").

Data received by host 102 may be any type of data about an entity. For example, in a television entertainment setting, data received by host 102 may include network lineup, network information, director information, actor biographical information, digital versions of television shows, and the like.

After receiving the data, host 102 classifies the received data from the originator 104 (stage 306). Host 102 may classify the received data based on attributes of the data and attributes of originator 104. Attributes of the data may be data received, time received, size of data, type of data, and the like. Attributes of originator 104 may be access account of the originator, relationship to the entity, and the like.

Then, host 102 stores the classified data in the content management system (stage 308). Host 102 may store the classified data in a database such as database 208 illustrated in FIG. 2. Host 102 may store a copy of the classified data. Additionally, host 102 may determine if an additional copy of the classified data exists. If so, host 102 may store a reference to the additional copy.

Host 102 may store metadata in addition to the classified data. The metadata may include origins of the classified data and authentication information of the classified data. For example, the metadata may include information such as time/date of reception, size of data, type of data, access account of originator 104, relationship of originator 104 to entity, and the like.

After data has been received, classified and stored, the content management system hosted by host 102 allows classified data received from originators to be authenticated. By authenticating the data, originators 104 may insure that data in the content management system is accurate and complete. Further, subscribers 106 requesting data from the content management system may rely on the data as being accurate.

Figure 4:
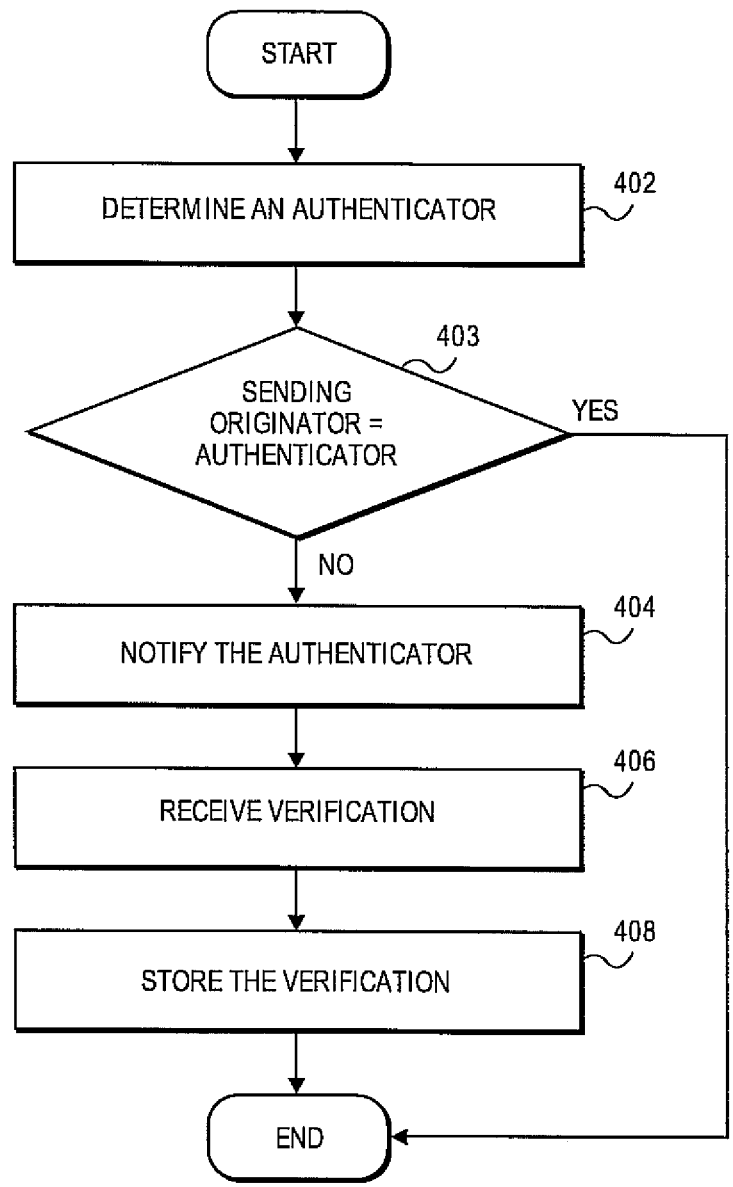
FIG. 4 is a flow chart illustrating a method 400 for authenticating data in a content management system consistent with embodiments of the present disclosure.

Host 102 may authenticate the data by determining an authenticator of the classified data. The authenticator may be the most appropriate person to authenticate the data. Host 102 may determine an authenticator by determining the entity most related to the classified data and determining an originator 104 representing or designated to authenticate the information. As such, host 102 may determine the originator in the best position to authenticate the data. FIG. 4 is a flow chart illustrating a method 400 for authenticating data received from originators 104.

Method 400 begins with host 102 determining an authenticator of the classified data received from an originator 104 (stage 402). The authenticator may be any originator capable of verifying the classified data. The authenticator may be the particular originator who sent the classified data. Additionally, the authenticator may be a different originator.

To determine an authenticator, host 102 may determine entities related to the classified data. Typically, the entity related to the data would be an entity about which the data primarily concerns. For example, in television entertainment, if host 102 received data about a network's television lineup, host 102 would determine that the television network was primarily related to the data.

Next, host 102 may determine originators related to the determined entities and designated to authenticate the classified data. These originators may be designated by the entity or designated and verified by the content management system. Then, host 102 may select the determined originators as authenticators of the classified data.

If host 102 determines that the authenticator is the particular originator 104 that sent the data, host 102 may consider the data as self-authenticated (stage 403). As such, host 102 authentication is not required and the authentication ends.

If the authenticator is not the particular originator 104 that sent the data, host 102 notifies the determined authenticator. Host 102 notifies the authenticator that classified data has been received which requires verification (stage 404). Host 102 may notify the authenticator the next time the authenticator accesses the content management system. Further, host 102 may immediately notify the authenticator by transmitting notification to the authenticator.

Next, host 102 receives verification from the authenticator (stage 406). The verification may be an acceptance or rejection of the classified data as being accurate or correct. The verification may also be an acceptance of the classified data as a duplicate of previously authenticated data.

Then, host 102 stores the received verification (stage 408). Host 102 may store the information with the classified data. Host 102 may store the verification in a database such as database 208 illustrated in FIG. 2.

In method 400, if host 102 determines that the authenticator is the particular originator 104 that sent the data, the data is immediately authenticated. Otherwise, host 102 may indicate that the classified data is denied or pending authentication until verification is received from an authenticator.

Figure 5:
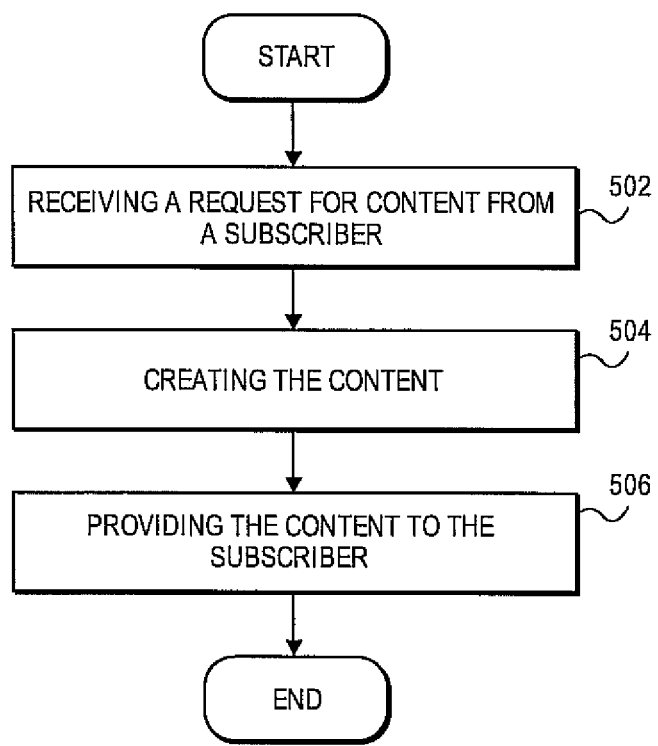
FIG. 5 is a flow chart illustrating a method 500 for providing content in a content management system consistent with embodiment of the present disclosure.

As mentioned above, the content management system hosted by host 102 may also provide content to subscribers 106. Host 102 may create and provide the content based on a request from subscribers 106. Host 102 may include classified data in the content based on one of: the request from the at least one subscriber, a preference of the at least one subscriber, the at least one subscribers' relationship with the classified data, and authentication of the classified data. FIG. 5 is a flow chart illustrating a method 500 for providing content to subscribers.

Method 500 begins with host 102 receiving a request for content (stage 502). The request may be a request for a single instance of content. Additionally, the request may be a request for continuing content. The request may include information about the subscriber and information about data to be included in the content.

Next, host 102 creates the content (stage 504). Host 102 may base the data included in the content on the request from the at least one subscriber, a preference of the at least one subscriber, the at least one subscribers' relationship with the classified data, and authentication of the classified data.

Then, host 102 provides the content to subscribers 106 (stage 506). Host 102 may provide a copy of the content to subscribers 106. Likewise, host 102 may provide a reference to the content. For example, host 102 may provide subscriber 106 with Java script or html code.

The content management system described above may manage any type of data received from multiple originators. FIGS. 6-18 are diagrams illustrating host 102 hosting an exemplary content management system 602 for the music industry setting 600. One skilled in the art will realize that FIGS. 6-18 are exemplary and that the content management system hosted by host 102 may store any type of data.

Figure 6:
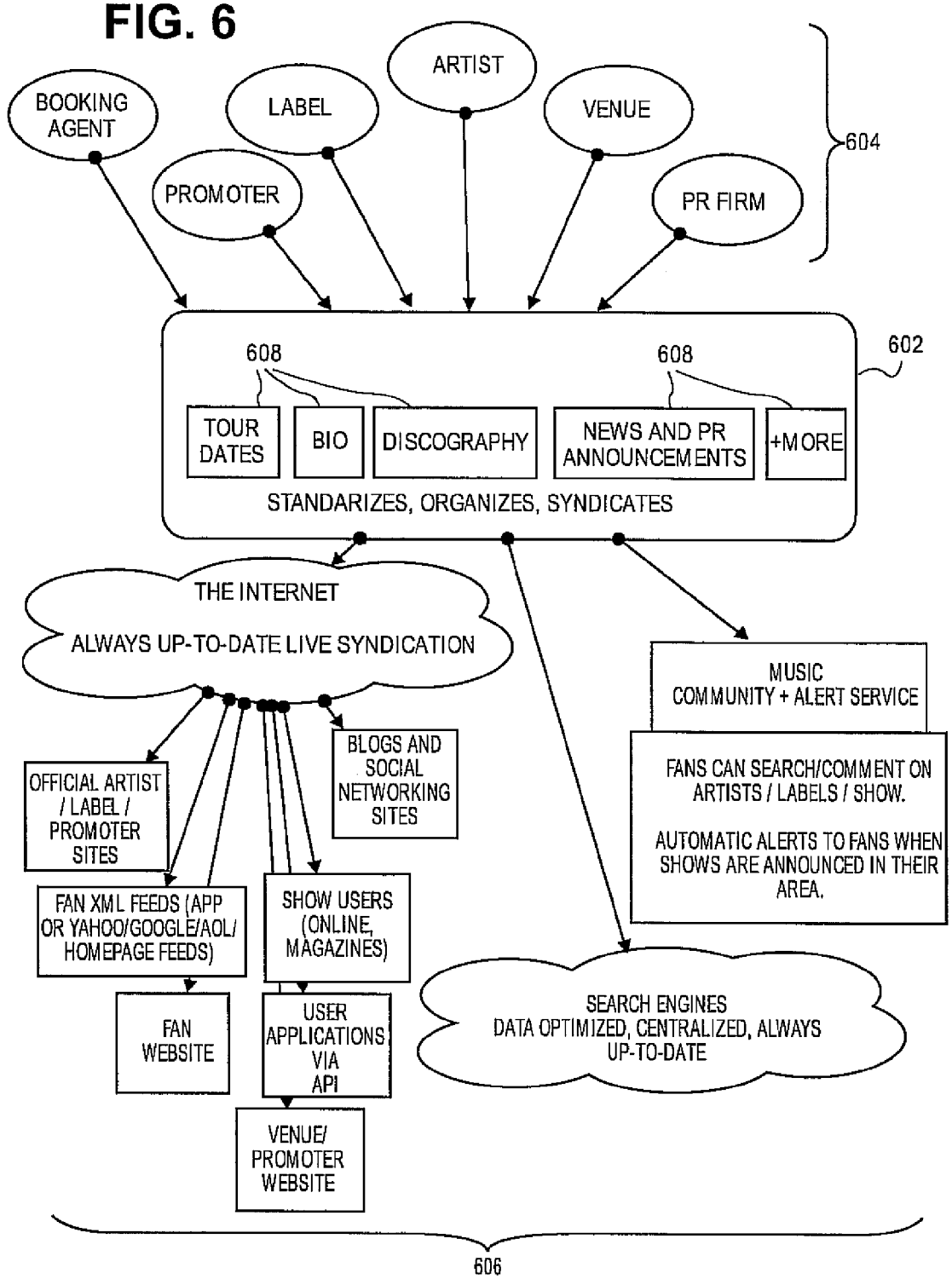

As illustrated in FIG. 6, music industry setting 600 includes a content management system 602, entities 604 working through originators, and subscribers 606. Content management system 602 includes data which may be classified in categories 608 relevant to the music industry. Content management system 602 may be implemented in a system 100 described above with content management system 602 being hosted by a host 102.

In setting 600, the originators may simply be a person, business, website, data service, and the like, that is designated to enter information into the system on the behalf of an entity 604. The originator may be authorized by entity 604 or authorized and verified by content management system 602. In content management system 602, entities 604 may be considered abstract ideas. As such, content management system 602 may allow multiple levels of permission, relations, and organization.

Content management system 602 allows originators for entities 604 such as bands, labels, booking agents, PR firms, and venues, to work together more efficiently. Content management system 602 hosted on a host 102 may provide web-based tools to achieve the collaboration between originators. Content management system 602 provides a central workspace that allows originators to collaboratively enter and approve data quickly and simply. Content management system 602 may then categorize, standardize, format and syndicate the data across entities' websites and third party(ies) websites.

Content management system 602 may allow originators to enter data for entities, and give subscribers the opportunity to create custom information feeds with different isolation or filter levels. For example, an originator working through an artist may configure an information feed to allow for the inclusion of information entered by a related record label without the approval of that information by an originator primarily associated with the artist. This example information feed can then be used to syndicate the information, such as displaying information directly on the artists website. The originator working through the artist may additionally configure the information feed so that only certain types of information are handled in this manner, such as allowing for the inclusion of information provided by the label only if that information is categorized as biographic information or release dates; and requiring approval of an originator primarily connected with the artist for other information provided by the label. This functionality may prove incredibly useful in situations such as a large record label which must have the approval of their legal department for any content that appears on their website: isolation and filter levels ensure that only relevant information cleared by the corporation will appear on their websites.

Figure 7:
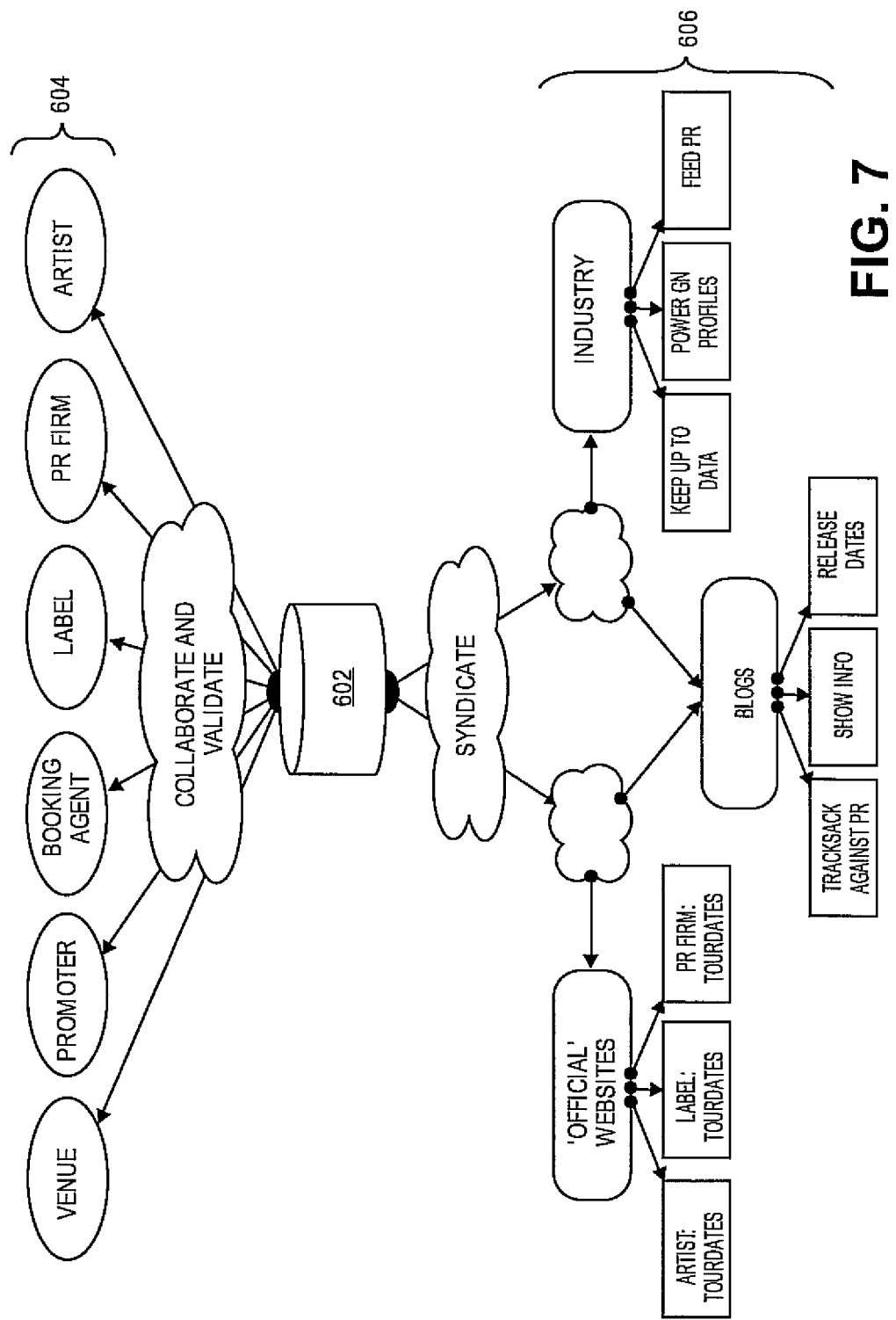

As illustrated in FIG. 7, content management system 602 allows originators related to entities to collaborate and validate data. Content management system 602 achieves this collaboration by allowing access to originators; receiving data about entities 604 from the originators, classifying the data, and storing the classified data in the content management system 602. Content management system 602 receives data from the originators associated with entities 604. In order to enter information, the originators are granted a relation to one or more entities 604.

For example, entity 604 defined as artist may define the band U2. In such a case, content management system 602 may establish an

```
Entity #604
    Name: U2
    Data:
        Members are: Bono (Paul David Hewson)
                     The Edge (David Howell Evans)
                     Adam Clayton
                     Larry Mullen Jr.
        Label is: Interscope
        Booking agent is: William Morris
```

From entity #604, content management system may define additional entities such as:

```
Entity #60002
    Name: Interscope Records
    Artists: U2
    Data:
        Employees are: John Smith
Entity #60003
    Name: William Morris
    Artists: U2
    Data:
        Employees are: Jane Smith
```

For this example, each entity #604, #60002, and #60003 may have one or more originators associated. Further, each originator may have a role/relation to an entity. For example, content management system 602 may allow access to the following

```
Originator #802
    Name: Bono
    Role to U2: Artist - Self/Member
Originator #804
    Name: John Smith
    Role to Interscope: Label - Self/Employee
Originator #806
    Name: Jane Smith
    Role to William Morris: Agency - Self/Employee
```

In content management system 602, data is classified based on the originators' relation to the entity. For example, if content management system 602 receives data about a new U2 show from Bono, content management system 602 may classify the data as follows:
    Entered by Bono (relation, role—"Artist, Self/Member") on "Date".

If content management system 602 receives data from John Smith about a new video, the content management system may classify the data as follows:
    Entered by John Smith (relation, role—"Label, Self/Employee") on "Date".

After classifying, content management system 602 may store the classified data including the metadata.

As illustrated in FIG. 7, content management system 602 may also authenticate or validate the data received from originators. The authentication is based upon an entity's relationship with the data and the originators' relationship with entity.

Figure 8A:
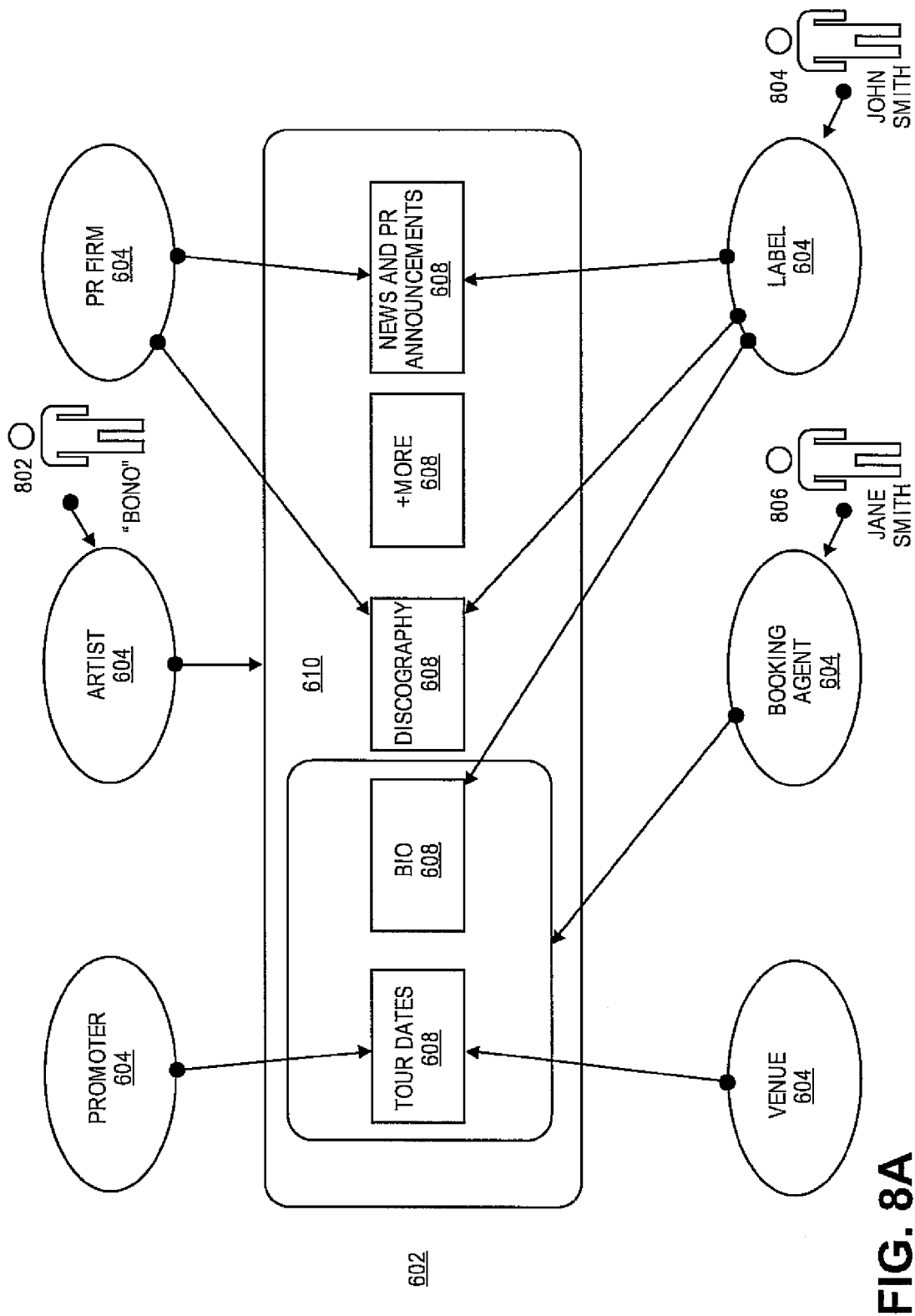

FIG. 8A is a diagram illustrating the relationships of various entities and originators in content management system 602 when receiving and authenticating data in an artist record 610 for the band U2. As illustrated using a previous example, originator 802 "Bono" may be associated with the artist as an originator for U2. Content management system 602 may also receive data from other originators such as originator 804 "John Smith" and originator 806 "Jane Smith" associated with the label and booking agent, respectively.

As there is an overlap of concerns between the interests of the entities these originators represent and certain categories of the artist record, content management system 602 may classify the overlapping content as relevant to the artist record. Additionally, originators need not be primarily associated to an entity with a 'same-as' relationship. For example, information entered by 804 John Smith may be correlated with the U2 record by the relationship between the label and the artist, making the information appear as claimed from the perspective of U2 but authenticated from the perspective of the label. As such, information entered by 806 Jane Smith may appear as authenticated from both the perspectives of U2 and William Morris if Jane Smith were able to act as an authenticator for both entities.

Content management system 602 may authenticate the data by determining an authenticator of the classified data. The authenticator may be the most appropriate person to authenticate the data. Content management system 602 may determine an authenticator by determining the entity most related to the classified data and determining an originator representing or designated to authenticate the information. As such, content management system 602 may determine the originator in the best position to authenticate the data.

The authenticator may be any originator capable of verifying the classified data, such as originators 802, 804, and 806.

The authenticator may be the particular originator who sent the classified data. Additionally, the authenticator may be a different originator.

To determine an authenticator, content management system 602 may determine entities related to the classified data. Typically, the entity related to the data would be an entity about which the data primarily concerns.

Content management system 602 may determine originators related to the determined entities and designated to authenticate the classified data. These originators may be designated by the entity or designated and verified by the content management system. Then, content management system 602 may select the determined originators as authenticators of the classified data.

If content management system 602 determines that the authenticator is the particular originator that sent the data, content management system 602 may consider the data as self-authenticated. As such, content management system 602 authentication is not required and the authentication ends.

For example, content management system 602 may receive data from originator 802 regarding biographical information about U2. Content management system 602 determines that U2 is the entity most related to the data and that originator 802 is allowed to authenticate the data. As such, content management system 602 may determine the data to be self-authenticated.

If the authenticator is not the particular originator that sent the data, host 102 notifies the determined authenticator. Content management system 602 notifies the authenticator that classified data has been received which requires verification. Content management system 602 may notify the authenticator the next time the authenticator accesses the content management system. Further, content management system 602 may immediately notify the authenticator by transmitting notification to the authenticator.

For example, content management system 602 may receive data from originator 804 regarding biographical information about U2. Content management system 602 determines that U2 is the entity most related to the data and that originator 804 is not allowed to authenticate the data. As such, content management system 602 may notify originator 802 that data has been received which needs to be verified. Content management system 602 may then receive verification from originator 802, who is the determined authenticator for U2. Content management system 602 may mark the data as pending verification until verification is received. Content management system 602 may additionally determine that this information is also primarily relevant to the record label Interscope Records which originator 804 is allowed to authenticate data for. As such, content management system 604 would still allow for this information to be viewable as verified from the context of Interscope records though the use of information feeds with different isolation or filter levels as previously explained.

Content management system 602 may allow an entity to choose additional originators to self-authenticate certain categories of information. For example, U2 through originator 802 "Bono" may designate booking agent as an authenticator of biographic information. As such, data received from originator 806 "Jane Smith" concerning biographic information may be self-authenticated. Further, originator 806 may authenticate this type of data. Content management system 602 may also designate authenticator of data. The entity may choose and configure additional originators through the actions of originators vested with the appropriate permissions to do so by content management system 602.

Figure 8B:
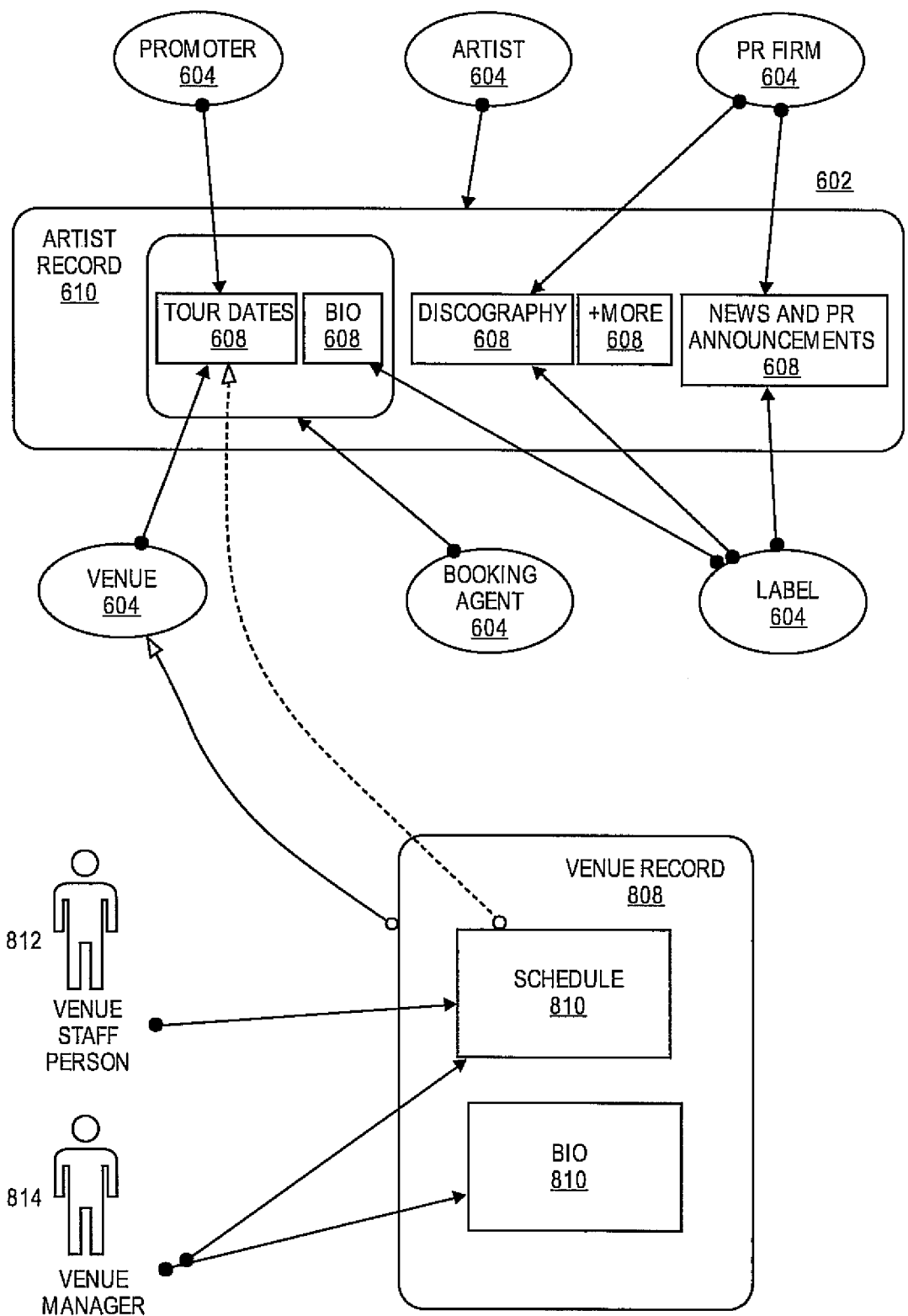

Content management system 602 may include multiple records concerning multiple entities. Content management system 602 may allow the data in the multiple records to be cross-referenced when the data is related. FIG. 8B is a diagram illustrating two exemplary records contained in content management system 602. One skilled in the art will realize that FIG. 8B is exemplary and that content management system may include any number and type of records.

As illustrated in FIG. 8B, content management system 602 may include an artist record 610 and a venue record 808. Originators 812 "venue staff person" and 814 "venue manager" may be associated with the entity venue for entering data and authenticating data.

When content management system 602 receives data from originators 812 and 814, content management system 602 determines if the data is related to any other entities. If so, content management system 602 may cross-reference the data with the other entity. Content management system 602 may also notify the other entity and may seek authentication from the other entity.

For example, content management system 602 may receive a U2 tour data from originator 812 to be stored in venue record 808. Since the data is related to the artist entity U2, content management system 602 may cross-reference this information with artist record 610. Further, if the tour date is primarily related to the artist entity U2, content management system 602 may seek authentication from an originator associated with U2 such as originator 802 "Bono".

Returning to FIG. 7, content management system 602 may provide content to subscribers 606. All data stored in content management system 602 is abstracted and categorized into standardized formats and specific topics, stamped with entry attributes, and made ready for syndication.

If host 102 is hosting content management system 602, host 102 may provide the content by any well-known web based protocol. For example, host 102 may provide content using protocols such as JS/RSS, xml, json, flash, dhtml. Host 102 may provide a copy of the content as requested or may provide a reference to the content. For example, host 102 may provide subscribers with a line of Java script/html code or widgets that they copy/paste into their own website. The code will serve content directly to the subscriber from host 102 in a seamless fashion. Host 102 may also serve the content directly for the subscriber by hosting a customized web page on behalf of the subscriber. As such, subscribers may customize the look/feel of the elements to seamlessly integrate with their own site or use default styles. Host may attach a small "Content Provided by host 102" message.

Subscribers 606 may set an isolation level or filters in a request for content from content management system 602. These isolation levels and filters may be based on such parameters as data type, originator of the data, and authentication of the data (such as verified or denied), and the like. For example, Interscope may enter a U2 record release. U2 may set the isolation level to allow Interscope updates to syndicate onto U2 feeds. The U2 website and fan feeds will automatically reflect this entry.

Alternatively, Interscope may enter a U2 record release. U2 may set the isolation level set to not allow interscope updates to syndicate onto its own feeds. The U2 website and fan feeds will not contain this information unless U2 explicitly approves it.

Figure 9:
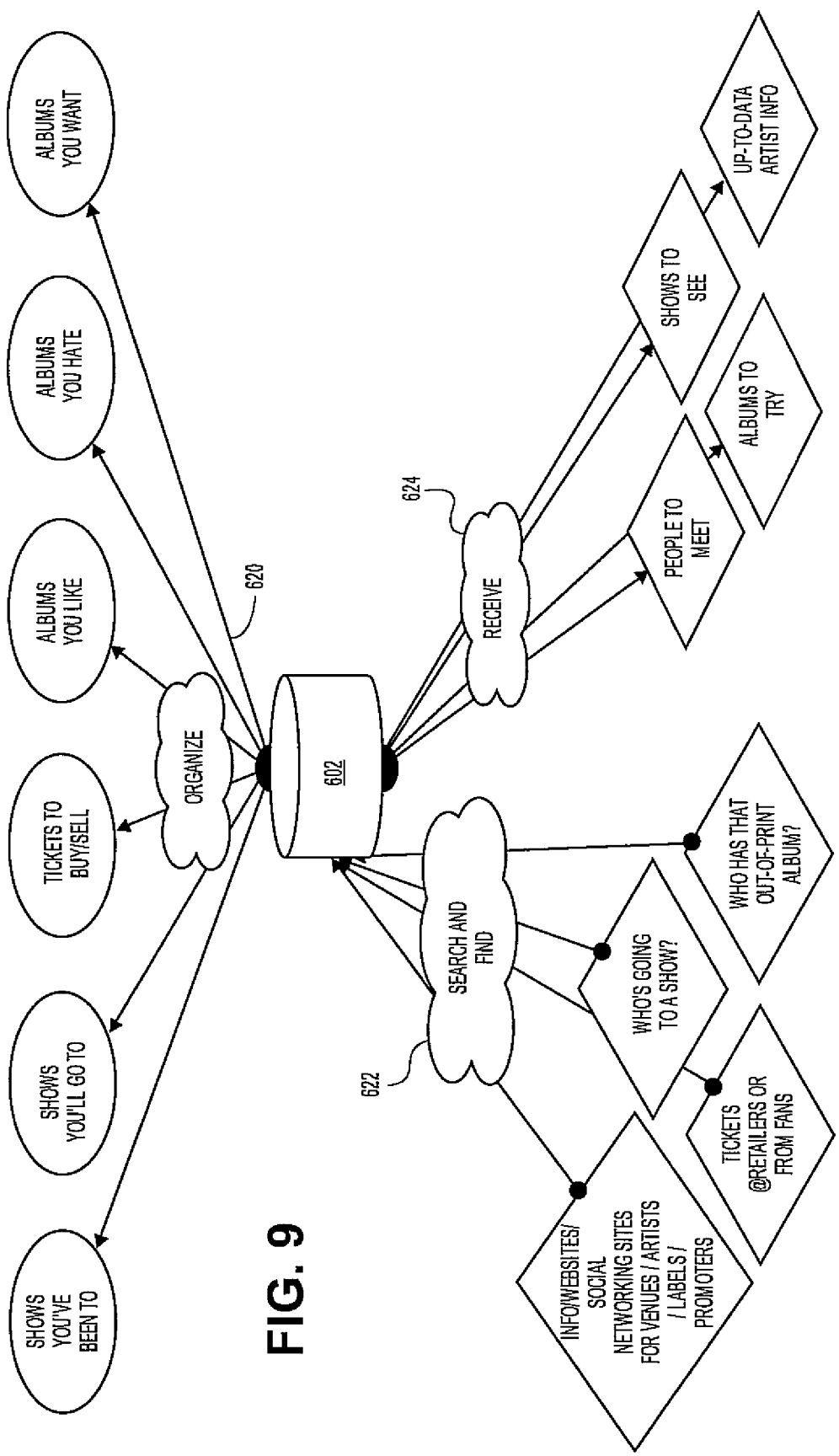

In addition to processes described above, content management system 602 may allow originators and subscribes to enter data related to fans and consumers in the music industry setting. FIG. 9 illustrates an exemplary process that may be performed by originators and subscribers related to fans and consumers. For example, an originator or subscriber may enter and organize opinions about an artist, search for information in content management system 602, and receive other data entered by other originators and subscribers.

As mentioned above, content management system 602 may provide access through a web application. FIGS. 10, 11, 12A-C, 13A, 13B, 14, 15A, 15B, 16, 17A, 17B, and 18 are diagrams illustrating the various application interfaces in a web application providing access to the content management system.

FIGS. 10, 11, 12A-C, 13A, 13B, 14, 15A, 15B, 16 illustrate exemplary interfaces for an originator associated with artist entity. One skilled in the art will realize that content management system 602 may include any number of similar application interfaces for different originator or subscribers. Further, one skilled in the art will realize that content management system 602 may include additional interfaces associated with process described above.

FIG. 10 illustrates an application management interface. The application management interface allows an originator to select an entity for which to access content management system 602. The application management interface also allows an originator to select an operation to perform.

FIG. 11 illustrates another application management interface. This application management interface allows an originator related to the artist to view all show data received for the artist. The show data may be arranged according to whether the show is authenticated or unauthenticated.

Figure 12B:
Figure 12C:
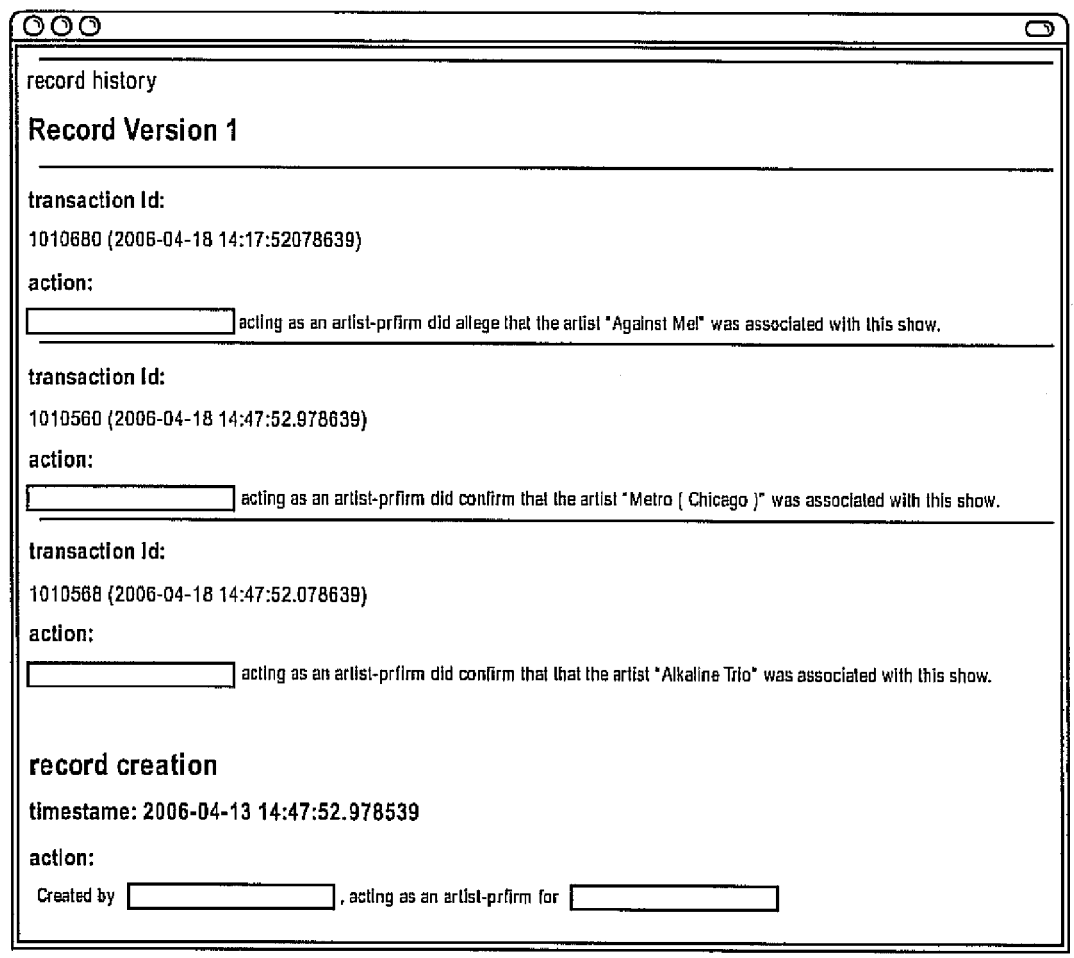

FIGS. 12A, 12B, and 12C illustrate another application management interface. This application management interface allows an originator related to the artist to view a show that needs authentication and that is entered by another originator. This application management interface allows the originator to authenticate the show by verifying or denying the show. The authenticator may also verify the show as a version of another show that has already been verified.

As illustrated in FIG. 12C, this application management interface may also list a history of data entered into this system. The history may be indicated by the originator that entered the data, the entities associated with the entity, and any authentication of the data. Originators may edit data—but any authentication previously received for that data would only correspond to the specific version of data that was authenticated, requiring the new information to be authenticated as well. For example, an originator can authenticate a concert date on behalf of U2 that was entered through an entity functioning as a supporting artist for that concert. The originator can then update the record for this concert to reflect a change in ticket price. Effectively this results in two versions of data for this concert; while both artists have authenticated the earlier version of the concert, only U2 has authenticated the new version. Coupling this functionality with the usage of filters and isolation levels, users can be presented with one or more versions of information regarding the same concert—as well as perspectives from which the information is verified. We see an example of this filtering and isolation in example 16b, where a reference to another version of the same event is located.

FIGS. 13A and 13B illustrate another application management interface. This application management interface allows the originator to request content as a subscriber. As illustrated, the interface allows the originator to acquire a reference to data in content management system 602. For example, the originator may obtain a reference in formats such as iFrame, XML, or Flash.

FIG. 14 illustrates another application management interface. This application management interface may display a list of current shows for a particular artist. The list may include information about the show and an indication of whether the show is verified by the artist ("A").

As mentioned above, content management system 602 may allow originators and subscribers to enter and receive data about fans and consumers in the music industry setting. FIGS. 15, 16A, 16B, 17, 18A, and 18B illustrate application interfaces for allowing originator and subscriber to enter and receive data about fans and consumers in the music industry setting. In this exemplary system originators and subscribers are able mark their relations to concerts and entities, and to request receiving additional information from entities (either directly or brokered through the system). Originators and subscribers are also able to search for subscribers matching specified conditions.

Figure 15:
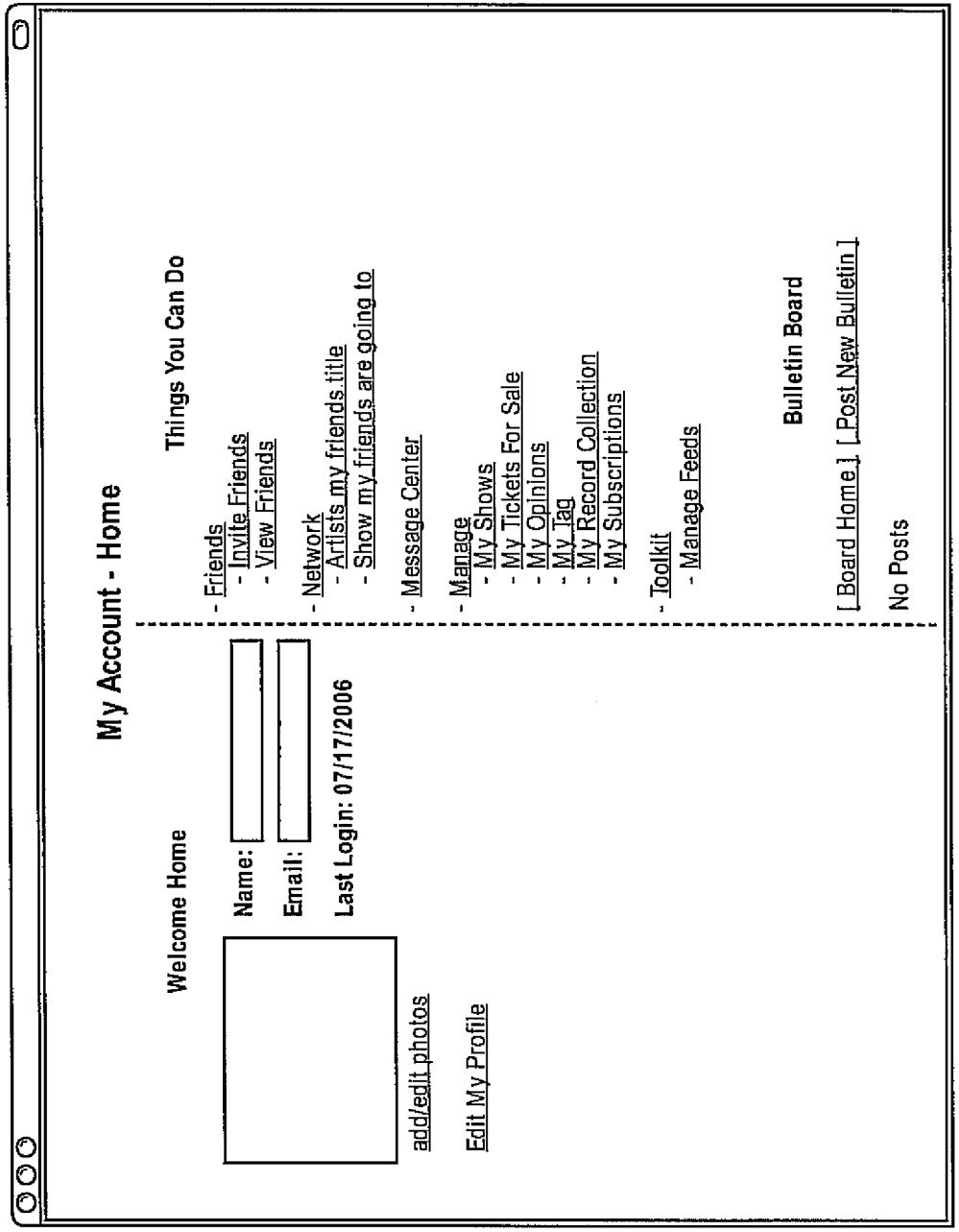

FIG. 15 illustrates an application interface that may display information about a particular fan or consumer. This application interface may allow a fan or consumer to link to additional application interfaces.

Figure 16A:
Figure 16B:
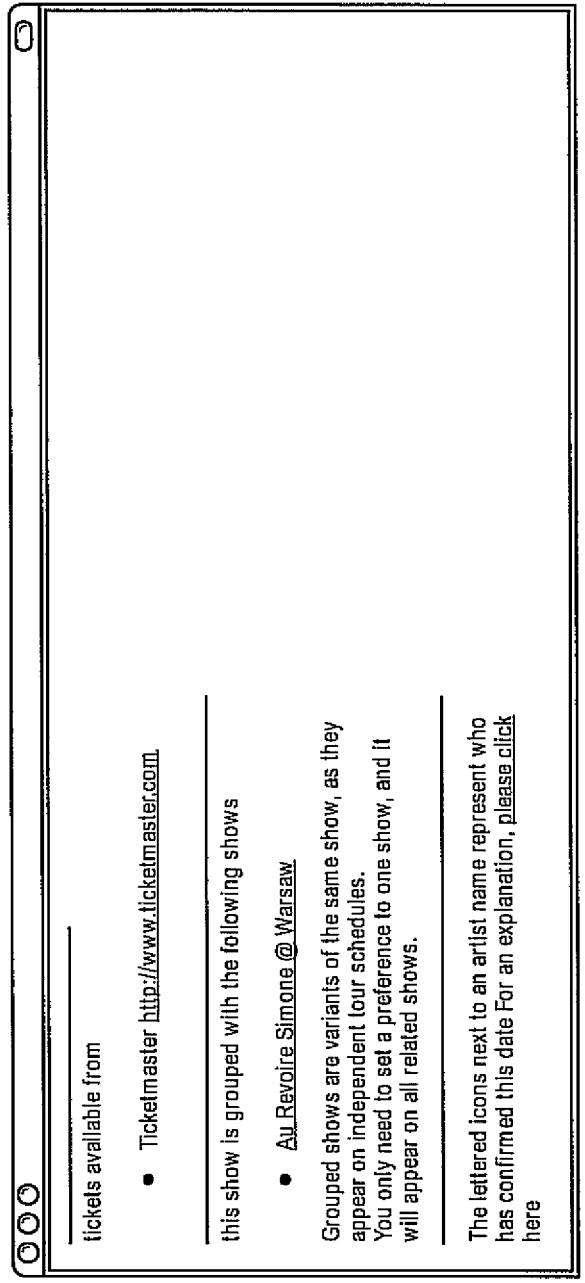

FIGS. 16A and 16B illustrate another application interface. This application interface may display a particular show and information about the show. This application interface may allow a fan or consumer to enter opinion information about a particular show or see opinion information about a particular show. In this application interface, as illustrated in FIG. 16b, information regarding multiple entities has been cross referenced, and references a variant of the same show as authenticated by another entity.

FIG. 17 illustrate another application interface. This application interface may display a particular venue and information about the artist and shows appearing at the venue. The interface may display an indication that an artist has authenticated a particular show.

Figure 18A:
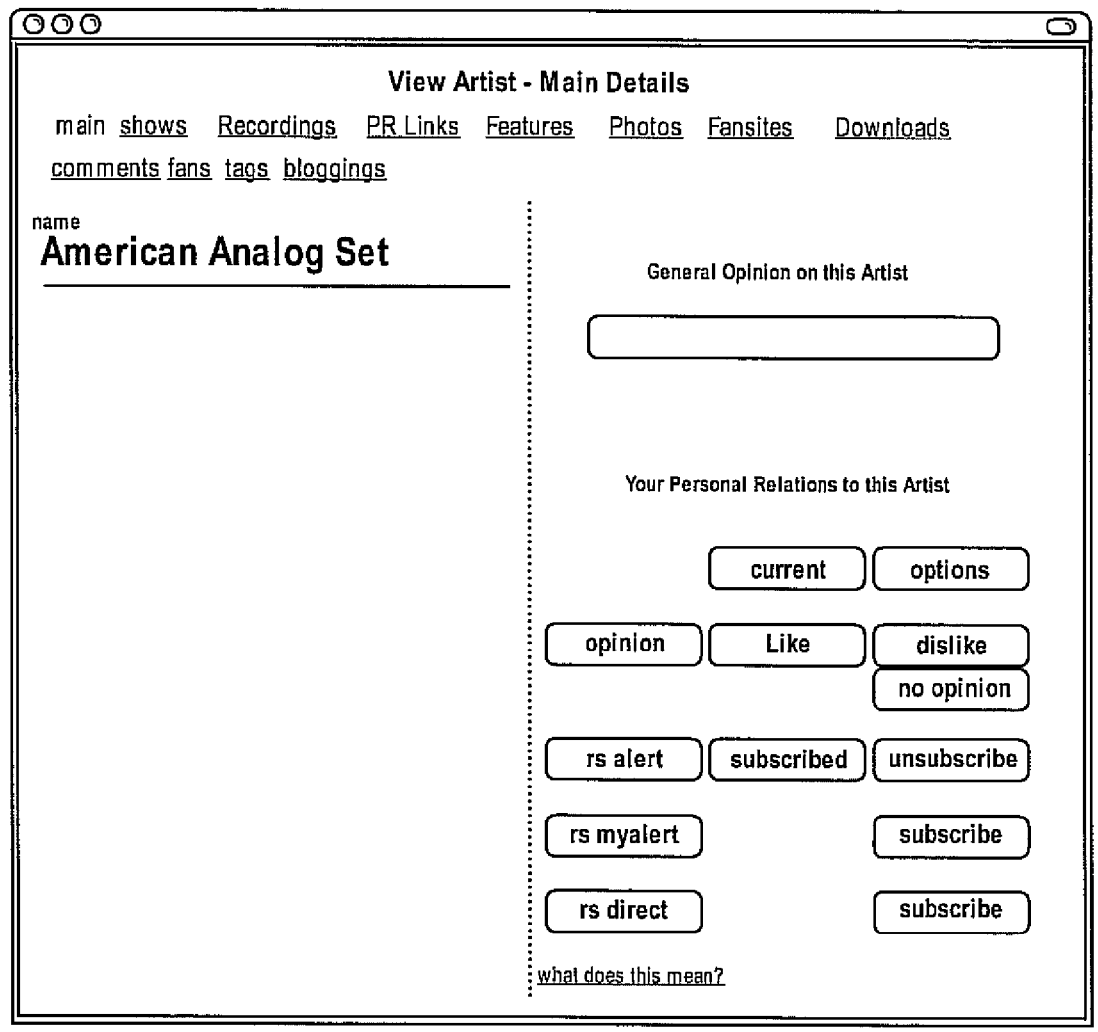
Figure 18B:
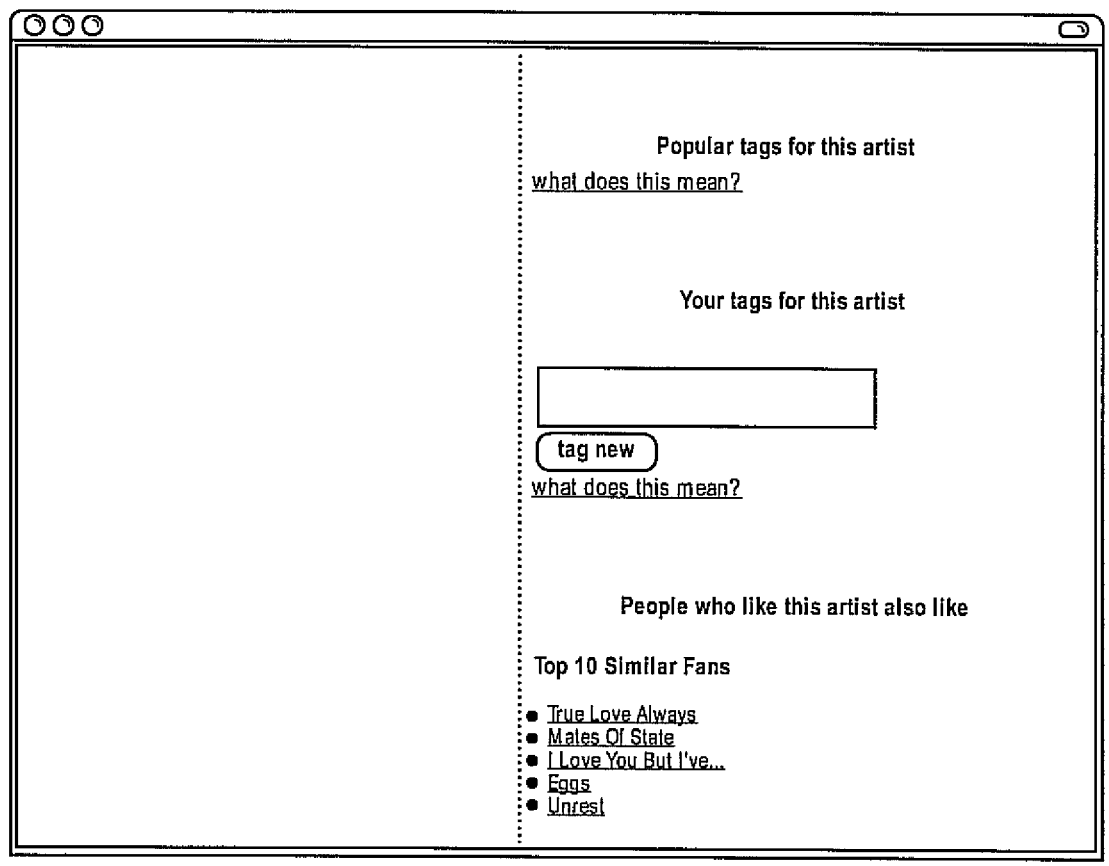

FIGS. 18A and 18B illustrate another application interface. This application interface may display a particular artist and information about the artist. This application interface may allow a fan or consumer to enter opinion information about a particular artist or see opinion information about a particular artist.

Other embodiments of the present teaching will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for managing entity related data in a content management system, comprising:
   allowing access to the content management system to a plurality of originators, wherein a first originator of the plurality of originators is primarily associated with an entity;
   receiving data about the entity from a second originator of the plurality of originators via the content management system, wherein the second originator is not primarily associated with the entity and is related to the entity through one or more other entities;
   automatically classifying the data based on one or more of attributes of the data, attributes of the second originator, and attributes of the entity;
   automatically determining an authenticator, wherein the authenticator is an originator of the plurality of originators in a best position to authenticate the data for the entity based on—
      the classification, and
      a relationship between the second originator and the entity;

detecting an authentication, by the authenticator, of the classified data;

storing the classified data in a memory in the content management system; and displaying the classified data to a plurality of subscribers based on one or more of the classification, the relationship between the second originator and the entity, and the authentication.

2. The method of claim 1, wherein the authentication is based on (i) the relationship between the second originator and the entity, and (ii) an additional relationship between the entity and the data.

3. The method of claim 1, wherein detecting the authentication comprises:

receiving a verification of the classified data from the authenticator indicating an accuracy of the classified data; and storing the verification of the classified data.

4. The method of claim 3, wherein the verification comprises a confirmation or a rejection of the classified data.

5. The method of claim 3, wherein the verification comprises a confirmation of the classified data as a duplicate of previously authenticated data.

6. The method of claim 1, wherein determining the authenticator, comprises:

determining a set of originators of the plurality of originators related to the entity and designated to authenticate the classified data; and selecting the authenticator from the set of originators.

7. The method of claim 1, wherein the authenticator is the first originator when the first originator is designated to authenticate the classified data.

8. The method of claim 1, wherein the authenticator is a representative of the entity when the first originator is not designated to authenticate the classified data.

9. The method of claim 8, wherein the representative is designated as the representative of the entity by the entity or by the content management system.

10. The method of claim 1, further comprising notifying the authenticator of the data received from the second originator.

11. The method of claim 1, wherein storing the classified data comprises at least one of: storing a copy of the classified data and storing a reference to the classified data when the classified data has been previously stored.

12. The method of claim 1, wherein storing the classified data comprises storing metadata related to the classified data.

13. The method of claim 12, wherein the metadata comprises origins information and authentication information of the classified data.

14. The method of claim 1, wherein the plurality of originators' access to the content management system is established by the plurality of originators' relationship to the one or more other entities.

15. The method of claim 1, further comprising:

receiving, from a subscriber of the plurality of subscribers associated with the content management system, a request for content associated with the classified data; and providing the content to the subscriber.

16. The method of claim 15, wherein the content is determined based on at least one of: a relationship of the subscriber with the classified data, or the authentication of the classified data.

17. The method of claim 15, wherein the subscriber is one of: one of the plurality of originators, a content consumer, or an external system.

18. The method of claim 1, wherein the classified data is related to other entities and wherein the entity is configured to authenticate the classified data related to the other entities.

19. The method of claim 1, wherein at least one of the plurality of originators is configured to authenticate categories of the classified data for other entities.

20. A computer program product encoded with program code for supporting a content management system, the computer program product comprising:

program code for allowing access to the content management system to a plurality of originators, wherein a first originator of the plurality of originators is primarily associated with an entity;

program code for receiving data about the entity from a second originator of the plurality of originators via the content management system, wherein the second originator is not primarily associated with the entity and is related to the entity through one or more other entities;

program code for automatically classifying the data based on one or more of attributes of the data, attributes of the second originator, and attributes of the entity;

program code for automatically determining an authenticator, wherein the authenticator is an originator of the plurality of originators in a best position to authenticate the classified data for the entity based on— the classification, and a relationship between the second originator and the entity;

program code for detecting an authentication, by the authenticator, of the classified data;

a memory for storing the classified data in the content management system; and program code for displaying the classified data to a plurality of subscribers based on one or more of the classification, the relationship between the second originator and the entity, and the authentication.

21. The computer program product of claim 20, wherein the authentication is based on (i) the relationship between the second originator and the entity, and (ii) an additional relationship between the entity and the data.

22. The computer program product of claim 20, wherein detecting the authentication comprises:

receiving a verification of the classified data from the authenticator indicating an accuracy of the classified data; and storing the verification of the classified data.

23. The computer program product of claim 22, wherein the verification comprises a confirmation or a rejection of the classified data.

24. The computer program product of claim 22, wherein the verification comprises a confirmation of the classified data as a duplicate of previously authenticated data.

25. The computer program product of claim 20, wherein determining the authenticator, comprises:

determining a set of originators of the plurality of originators related to the entity and designated to authenticate the classified data; and selecting the authenticator from the set of originators.

26. The computer program product of claim 20, wherein the authenticator is the first originator when the first originator is designated to authenticate the classified data.

27. The computer program product of claim 20, wherein the authenticator is a representative of the entity when the first originator is not designated to authenticate the classified data.

28. The computer program product of claim 27, wherein the representative is designated as the representative of the entity by the entity or by the content management system.

29. The computer program product of claim 20, further comprising program code for notifying the authenticator of the data received from the second originator.

30. The computer program product of claim 20, wherein storing the classified data comprises at least one of: storing a copy of the classified data and storing a reference to the classified data when the classified data has been previously stored.

31. The computer program product of claim 20, wherein storing the classified data comprises storing metadata related to the classified data.

32. The computer program product of claim 31, wherein the metadata comprises origins information and authentication information of the classified data.

33. The computer program product of claim 20, wherein the plurality of originators' access to the content management system is established by the plurality of originators' relationship to one or more other entities.

34. A computer capable of supporting a content management system, comprising:
 a processor configured with a content management application to—
  allow access to the content management system to a plurality of originators, wherein a first originator of the plurality of originators is primarily associated with an entity;
  receive data about the entity from a second originator of the plurality of originators via the content management system, wherein the second originator is not primarily associated with the entity and is related to the entity through one or more other entities,
  automatically classify the data based on one or more attributes of the data, attributes of the second originator, and attributes of the entity,
  automatically determine an authenticator, wherein the authenticator is an originator of the plurality of originators in a best position to authenticate the data for the entity based on—
   the classification, and
   a relationship between the second originator and the entity,
  detect an authentication, by the authenticator, of the classified data;
  store the classified data in the content management system; and
  display the classified data to a plurality of subscribers based on one or more of the classification, the relationship between the second originator and the entity, and the authentication; and
 a memory coupled to the processor for storing the content management application and the classified data.

35. The computer of claim 34, wherein the authentication is based on (i) the relationship between the second originator and the entity, and (ii) an additional relationship between the entity and the data.

36. The computer of claim 34, wherein the detecting the authentication comprises receiving a verification of the classified data from the authenticator, and storing the verification of the classified data.

37. The computer of claim 34, wherein determining the authenticator comprises determining a set of originators of the plurality of originators related to the entity and designated to authenticate the classified data, and selecting the authenticator from the set of originators.

38. The computer of claim 34, wherein the processor is further configured to execute the content management application to notify the authenticator of the data received from the second originator.

39. The computer of claim 34, wherein the processor is further configured to execute the content management application to store metadata related to the classified data.

* * * * *